United States Patent
von der Bank

(10) Patent No.: US 8,047,000 B2
(45) Date of Patent: Nov. 1, 2011

(54) GAS TURBINE COMBUSTION CHAMBER

(75) Inventor: Ralf Sebastian von der Bank, Rangsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1013 days.

(21) Appl. No.: 11/640,369

(22) Filed: Dec. 18, 2006

(65) Prior Publication Data
US 2007/0137206 A1    Jun. 21, 2007

(30) Foreign Application Priority Data
Dec. 19, 2005 (DE) .................. 10 2005 060 704

(51) Int. Cl.
*F02C 1/00* (2006.01)
*F02G 3/00* (2006.01)

(52) U.S. Cl. ........ 60/730; 60/751; 60/39.511; 60/39.53; 60/39.54; 60/39.55; 60/806

(58) Field of Classification Search .................. 60/730, 60/736, 751, 39.53, 39.54, 39.55, 806, 39.511; 415/175–178
See application file for complete search history.

(56) References Cited

U.S. PATENT DOCUMENTS

| | | | |
|---|---|---|---|
| 1,935,659 A | | 11/1933 | Noack |
| 2,569,446 A | * | 10/1951 | Bonvillian et al. ............. 60/800 |
| 3,355,883 A | | 12/1967 | Beam |
| 4,120,150 A | * | 10/1978 | Wakeman ................ 60/39.091 |
| 4,420,929 A | | 12/1983 | Jorgensen |
| 5,009,070 A | * | 4/1991 | Iizuka et al. .................... 60/753 |
| 5,724,816 A | * | 3/1998 | Ritter et al. ..................... 60/752 |
| 5,832,718 A | | 11/1998 | Suttrop |
| 5,979,370 A | * | 11/1999 | Franke .................... 122/235.14 |
| 6,164,075 A | * | 12/2000 | Igarashi et al. ................. 60/752 |
| 6,173,561 B1 | | 1/2001 | Sato |
| 6,295,803 B1 | * | 10/2001 | Bancalari .................. 60/39.511 |
| 6,655,147 B2 | * | 12/2003 | Farmer et al. ................... 60/752 |
| 6,843,059 B2 | * | 1/2005 | Burrus et al. .................... 60/751 |
| 2005/0172634 A1 | * | 8/2005 | Mukherjee .................... 60/775 |

FOREIGN PATENT DOCUMENTS

| | | |
|---|---|---|
| AT | 1 44 809 | 9/1935 |
| DE | 510847 | 10/1930 |
| DE | 30 00 672 A1 | 7/1980 |
| DE | 3511740 | 10/1986 |
| DE | 196 43 715 A1 | 4/1998 |
| DE | 698 13 960 T2 | 2/2004 |
| DE | 10 2004 016 462 A1 | 11/2005 |
| EP | 0020594 | 6/1987 |
| EP | 0725253 | 8/1996 |
| EP | 07 80 639 B1 | 6/1997 |
| FR | 980028 | 5/1951 |
| GB | 736759 | 9/1995 |
| WO | 01/31181 A1 | 5/2001 |
| WO | 0131181 | 5/2001 |

OTHER PUBLICATIONS

European Search Report dated Jan. 7, 2009 from corresponding foreign application.

* cited by examiner

*Primary Examiner* — William Rodriguez
*Assistant Examiner* — Craig Kim
(74) *Attorney, Agent, or Firm* — Timothy J. Klima; Shuttleworth & Ingersoll, PLC

(57) ABSTRACT

The invention relates to a gas turbine combustion chamber with a combustion chamber wall 1, with at least part of the combustion chamber wall 1 being provided with a liquid-cooling system.

9 Claims, 2 Drawing Sheets

Figure 4:
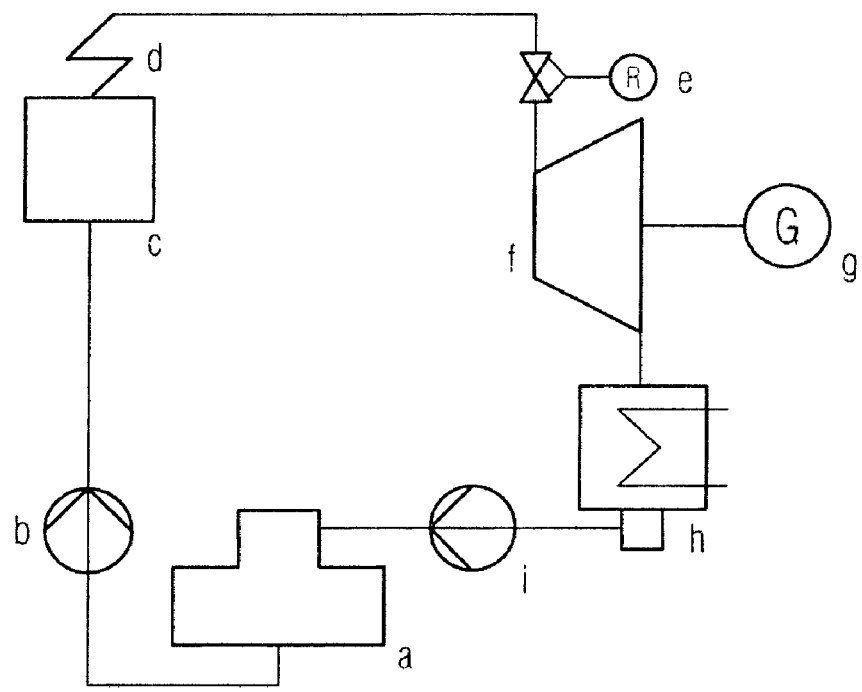

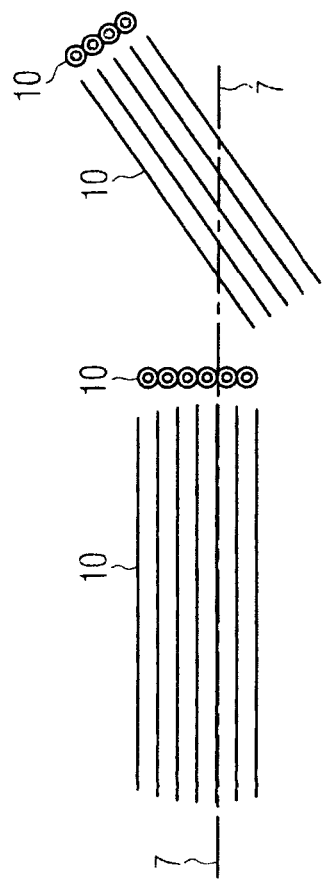
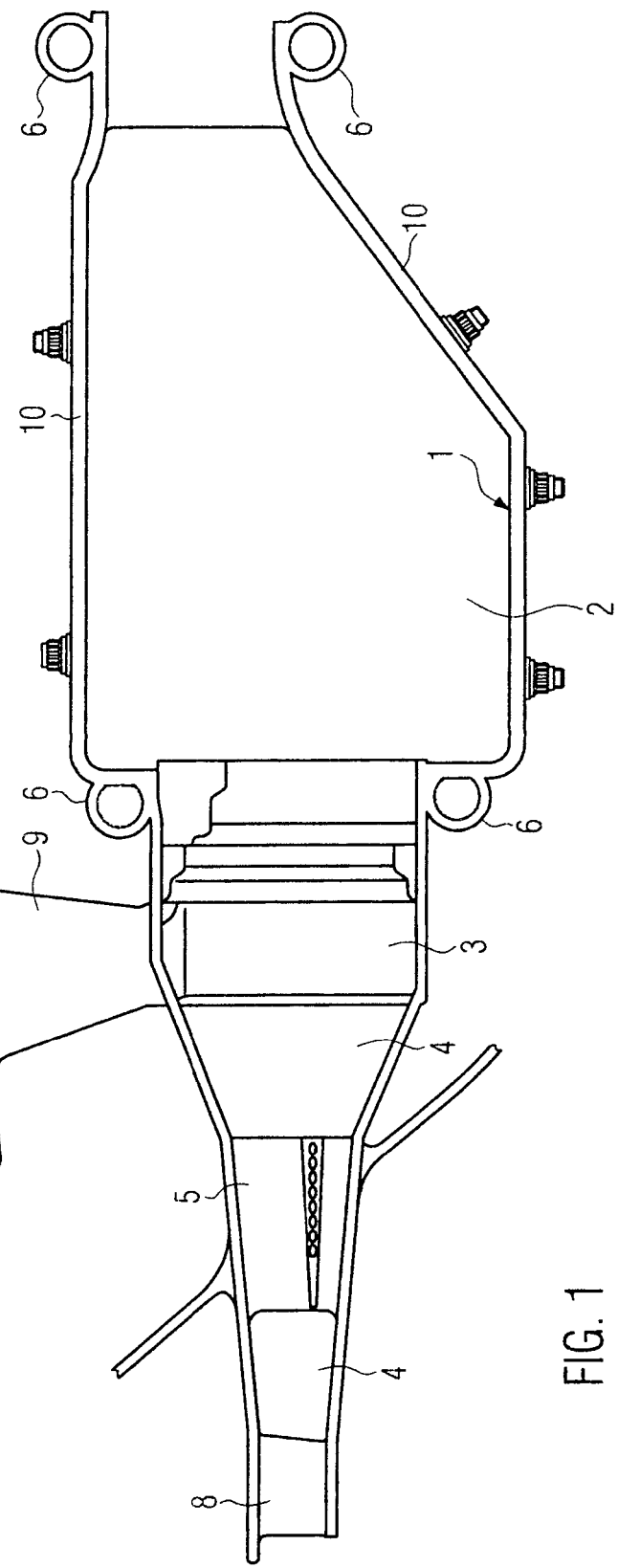

GAS TURBINE COMBUSTION CHAMBER

This application claims priority to German Patent Application DE10 2005 060 704.7 filed Dec. 19, 2005, the entirety of which is incorporated by reference herein.

BACKGROUND OF THE INVENTION

The present invention relates to a gas turbine combustion chamber, especially for an aircraft gas turbine or for a stationary gas turbine. As is known from the state of the art, air supplied by the compressor is used for cooling the combustion chamber wall. Without cooling, the compressor chamber wall would reach temperatures up to 2,600 K. Obviously, no materials are available which are capable of resisting such temperatures without cooling.

Disadvantageously, a relatively large part of the combustion air (between 30 and 50 percent of the total combustion air) must be used for cooling the combustion chamber.

With highly advanced, single-annular combustion chambers provided with lean premix burners, it is currently assumed that 60 to 70 percent of the combustion air (W30) is available for premixing in the lean premix burners to reduce NOx air pollutant emissions.

In the future, turbofan engines will possess significantly higher thermal efficiency and better propulsive efficiency than the state of the art.

As a result of both measures, the core engine must be operated with higher combustion chamber temperatures (entry and exit) and with a lower total air-fuel ratio, i.e. using a richer mixture.

In future combustion chambers, with a given constant cooling air efficiency, less air will, therefore, be available for premixing and the NOx air pollutant emissions will inevitably increase as a result of the higher combustion temperatures.

Accordingly, the only possibility with conventional engines is to provide sufficient combustion air to enable the premix to be leaned and the combustion temperatures correspondingly reduced. Here, efficiency of the air-cooling process can be increased to a limited extent only. It is not expected that the cooling air share can be decreased clearly below 30 percent.

DESCRIPTION OF THE INVENTION

A broad aspect of the present invention is to provide a gas turbine combustion chamber of the type specified above, which can be cooled efficiently without using cooling air, while being simply designed and easily and cost-effectively producible.

It is a particular object of the present invention to provide solution to the above problems by a combination of the features described herein. Further advantageous embodiments of the present invention become apparent from the description below.

The present invention, accordingly, provides a gas-tight, tubed combustion chamber wall, preferably of finned tubes, which are in contact with a flow of cooling liquid, preferably in a closed cooling circuit. The liquid can be a substance which is gaseous and/or liquid under atmospheric standard conditions.

The combustion chamber tubing arrangement of finned tubes can be such that a smooth or wavy surface is provided on the flame side.

On the coolant side, the tubes can be provided with installations and notchings to increase heat transfer from the tube inner side to the coolant.

As the coolant passes the combustion chamber tubing arrangement, it absorbs considerable thermal energy. This energy must be dissipated to maintain a closed cooling circuit.

This can advantageously be achieved by the following two approaches:

1.) A minimum temperature of the cooling circuit is accepted which corresponds to that of the compressor exit. In this case, a recuperative heat exchanger is arranged directly downstream of the compressor by which the heat energy absorbed in the combustion chamber tubing is transferred to the combustion air exiting from the compressor.

2.) The cooling circuit is used to drive a small turbine which provides the energy required to a) drive the pump(s) for maintaining circulation and b) drive a generator for covering the electric power demand of the onboard systems.

In principle, forced cooling circulation from power plant engineering is here applied. The circulating liquid is condensed in the small turbine and subsequently re-cooled to a temperature as low as possible. This can be accomplished by a liquid fuel-cooled heat exchanger.

Depending on the resultant thermal efficiency, the cooling liquid could, in principle, be brought to a very low temperature by an outside air cooler.

A combination of both re-cooling methods is possible.

The present invention accordingly provides the following advantages:

No cooling air is required for the combustion chamber wall.

The entire combustion chamber air is available to the lean premix burners.

The emission limits (ICAO) and the ACARE targets can be obtained also on engines with very high efficiency (thermal and propulsive).

Service life of the combustion chamber walls can be increased.

The present invention accordingly enables 100 percent of the total combustion air to be used in the lean premix burners. This minimizes the combustion temperatures and the formation of NOx air pollutants.

The water-cooled combustion chamber is preferably made of gas-tightly joined tubes. Principally, all liquid media can be used as a coolant.

The side of the combustion chamber which faces the flame is preferably smooth and can preferably be coated with, an insulating layer, preferably a ceramic insulation. The smooth design reduces the formation of deposits.

The tubes of the combustion chamber wall through which the coolant is routed can either be parallel to the engine longitudinal axis or inclined to the engine longitudinal axis, for example at an angle of up to 60 degrees.

The present invention, accordingly, provides for uniform heat absorption and low thermal distortion between adjacent tubes.

On the entry and exit sides, cooling water or coolant accumulators will preferably be provided. These ensure that the cooling water flows are uniformly discharged or charged.

Preferably, provision is further made to control coolant circulation by a pump-controlled forced circulation. Alternatively, natural circulation can be provided on stationary gas turbines which is controlled by a pump-controlled forced circulation only during start-up.

On a water-cooled combustion chamber wall of gas-tight tubing, the combustion chamber wall is capable of taking up the mechanical loads.

The cooling air ducts between the combustion chamber wall and the CCIC (combustion chamber inner casing) on the one hand and the CCOC (combustion chamber outer casing) on the other hand are no longer required. The heavy CCIC and CCOC components are dispensable. Weight is saved.

From the pre-diffusor, a direct, gas-tight, funnel-shape connection is made to the burner entries.

The supporting structures in the pre-diffusor, i.e. the compressor outlet guide vanes (OGV) and the supporting profiles (struts) are activated for the heat exchange process. Combustion air is pre-heated with thermal energy absorbed in the combustion chamber wall.

The thermally slightly expanding combustion air is aerodynamically stabilized. The pressure loss between compressor exit and combustion chamber entry is reduced.

The entire fuel supply is situated in the cold section. The complex thermal system of fuel supply and cooling is dispensable. Thermal stability of the fuel is uncompromised. Carbonization and formation of small coking cores in fuel flowing to the injection point is avoided.

The following applies to the combustion chamber pressure hull in an advantageous embodiment of the present invention: Since the flame tube is liquid cooled, cooling air need not be fed past the combustion chamber (outer and inner annulus) to be available for cooling the flame tube wall. Principally, a passage of cooling air will here only be required for the turbine (stators, primarily HP NGV1). For this, the outer and inner annuli are, however, no longer required. Accordingly, the liquid-cooled flame tube can be combined with the inner and outer combustion chamber pressure hull (CCIC & CCOC) to form one component. An integrated component "flame tube pressure hull" is introduced.

In accordance with the present invention, the following applies to the pre-diffusor: With the flame tube and combustion chamber pressure hull being integrated into one component, the space between flame tube head and pre-diffusor is no longer required. The flame tube head cowling and the pre-diffusor (in conventional terminology) are dispensed with. Normally, the pressure loss is increased by the shock at the exit of the pre-diffusor (dump loss). This loss can be avoided and, additionally, an optimization of the airflow from the compressor exit to the burner entry achieved by re-designing the inflow principle of the burner. In this case, a fixed number of OGVs (compressor outlet guide vanes) will be allocated to a burner. A component will be created which (in circular section) features a conical or funnel-shaped duct from the OGVs directly to the burner air inlets. The burner entry and the funnel inflow element (including OGVs) can be provided as an integrated component from the compressor exit. An integrated component "compressor exit burner inflow duct" is introduced.

Figure 5:
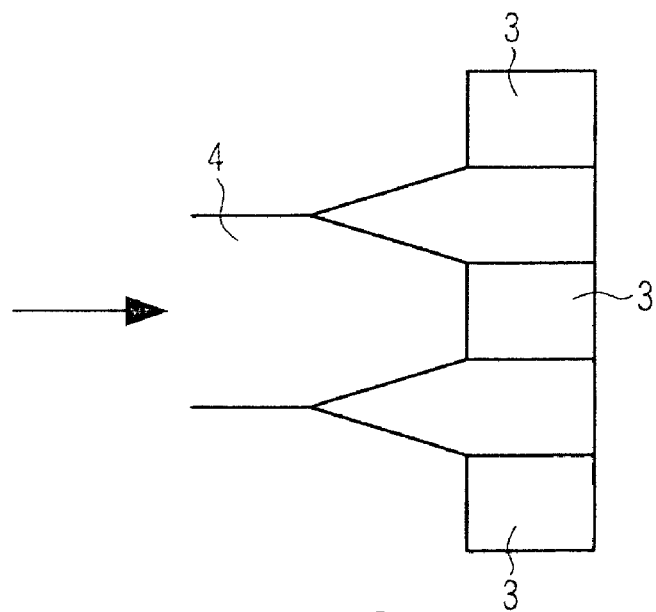

In the following, an embodiment of the present invention is more fully described in light of the accompanying drawings. In the drawings, FIG. 1 is a schematic, highly simplified side view of a gas turbine combustion chamber in accordance with the present invention, FIG. 2 is a detail view of the tubing arrangement in a first variant, FIG. 3 is a representation, analogically to FIG. 2, of a further tubing variant, FIG. 4 is a schematic representation of a cooling circuit, and FIG. 5 is a schematic top view of pre-diffusor and combustion chamber.

FIG. 1 schematically shows an inventive combustion chamber wall 1 of a gas-turbine combustion chamber 2, for example a lean combustion chamber. Upstream of the combustion chamber 2, a lean premix burner 3 and a pre-diffusor 4 are provided in this sequence. Interposed in the pre-diffusor 4 is a heat exchanger 5. In the area of the combustion chamber wall 1, cooling water accumulators 6 are shown on the inlet or outlet, respectively, which can have the form of an annulus or a chamber.

The combustion chamber wall 1 is a tubing arrangement being shown in FIGS. 1 and 2 in relation to a gas turbine axis 7. According to FIG. 2, the individual tubes 10, which are shown in the right-hand half of FIG. 2 in sectional view rotated by 90°, are arranged parallel to each other and parallel to axis 7, while FIG. 3 shows a corresponding arrangement in inclination.

As becomes apparent from FIG. 1, the carriers 9 for fuel supply can be significantly smaller since they are only required to supply fuel, not to influence the airflow.

Upstream of the pre-diffusor 4, guide vanes of the pre-diffusor or compressor indicated with reference numeral 8 are shown in schematic view. According to the present invention, these serve for coupling heat. This purpose is also served by the heat exchanger 5 which also recouples heat into the inflowing air.

FIG. 4 shows, in schematic representation, a simple power plant process (forced circulation) on whose principle the inventive cooling can be based. In the figure, the following applies:

a Feed water container
b Feed pump
c Steam boiler
d Superheater
e Control valve
f Steam turbine
g Generator
h Condenser
i Condensate pump In the present case, the steam boiler is to be related to the flame tube (without vaporization), while the vaporizer corresponds to the HP NGV1. The superheater here corresponds to the rotor blades or stator vanes of the turbine.

In order to ensure safe cooling of the combustion chamber under all flight conditions, vaporization is, other than in the real power plant process, not permitted in the combustion chamber tubing arrangement. Since the vaporization point depends on heat absorption and, accordingly, on thermal loading of the combustion chamber and engine thrust, controlled reflow of liquid water residues is difficult, if not impossible to realize.

Therefore, outlet temperature is controlled by the coolant flow. A control acts on the re-circulating pump. Subsequently, the coolant can be fed through the HP NGV 1 stator row, vaporized and overheated. The vaporized coolant can, for example, be routed. according to Specification DE 69213663 T2, or similar.

(Overheating must be controlled by water injection, as applicable, to avoid transgression of the material-side temperature limits.)

So-called feed water pre-heating is realizable in connection with an intercooler. Owing to the low inlet temperature, such an intercooler will be smaller and lighter than in present approaches and the heat removed would be used in the circulation.

FIG. 5 shows a schematic top view of a pre-diffusor 4 and the related lean premix burners 3. As indicated by the arrow, air will only flow to the burners; a further cooling airflow is not required. This results from the funnel-style contour of the pre-diffusor.

LIST OF REFERENCE NUMERALS

1 Combustion chamber wall
2 Combustion chamber
3 Lean premix burner
4 Pre-diffusor
5 Heat exchanger
6 Cooling water accumulator
7 Axis
8 Guide vanes of pre-diffusor or compressor
9 Carriers/stems for fuel supply
10 Finned tube/combustion chamber tubing

What is claimed is:

1. A gas turbine combustion system, comprising:
    an aircraft gas turbine combustion chamber having a combustion chamber wall at least partially formed from a plurality of individual hollow finned tubes connected to each other side-by-side and parallel to one another to form a gas-tight and integrated flame tube and combustion chamber pressure hull, wherein each of the individual tubes is connected to a cooling liquid supply, such that the cooling liquid will flow through the hollow portion of each tube to cool the tube to form a liquid cooling system which includes a closed cooling circuit; wherein a fluid is used in the liquid-cooling system, which is at least one of gaseous and liquid under atmospheric standard conditions; wherein the combustion chamber wall includes a heat-insulating material on a flame side, the heat-insulating material being a ceramic coating;
    a burner positioned at a head of the combustion chamber and having a burner air inlet;
    an expanding duct having a funnel shaped contour directly connecting an outlet of a compressor to the burner air inlet and feeding an entirety of the compressed air flowing therethrough to the burner air inlet, the expanding duct including a pre-diffusor casing;
    a recuperative heat exchanger positioned within the pre-diffusor casing for transferring heat energy absorbed by the cooling liquid in the combustion chamber tubes to combustion air from the compressor.

2. A gas turbine combustion chamber in accordance with claim 1, wherein the combustion chamber wall of finned tubes includes a smooth surface on a flame side.

3. A gas turbine combustion chamber in accordance with claim 1, wherein the combustion chamber wall of finned tubes includes a wavy surface on a flame side.

4. A gas turbine combustion chamber in accordance with claim 1, and further comprising a cooling circuit for energy dissipation of a heat energy in the combustion chamber tubing, wherein the cooling circuit removes heat energy absorbed by the cooling liquid and uses such heat energy to drive a turbine.

5. A gas turbine combustion chamber in accordance with claim 1, wherein the finned tubes are parallel to an axis of the combustion chamber.

6. A gas turbine combustion chamber in accordance with claim 1, wherein the finned tubes are inclined at a certain angle to an axis of the combustion chamber.

7. A gas turbine combustion chamber in accordance with claim 1, and further comprising at least one cooling water accumulator, which is connected to the finned tubes.

8. A gas turbine combustion chamber in accordance with claim 1, and further comprising guide vanes positioned upstream of the expanding duct, the guide vanes including a mechanism for transferring heat energy absorbed by the cooling liquid in the combustion chamber tubes to the combustion air from the compressor.

9. A gas turbine combustion chamber in accordance with claim 1, and further comprising a fuel supply shaft for a lean premix burner, the fuel supply shaft being positioned outside a combustion air inflow.

* * * * *